INVENTORS,
WINSTON E. BROWNLEE
JACK L. RITCHEY

BY

ATTORNEY,

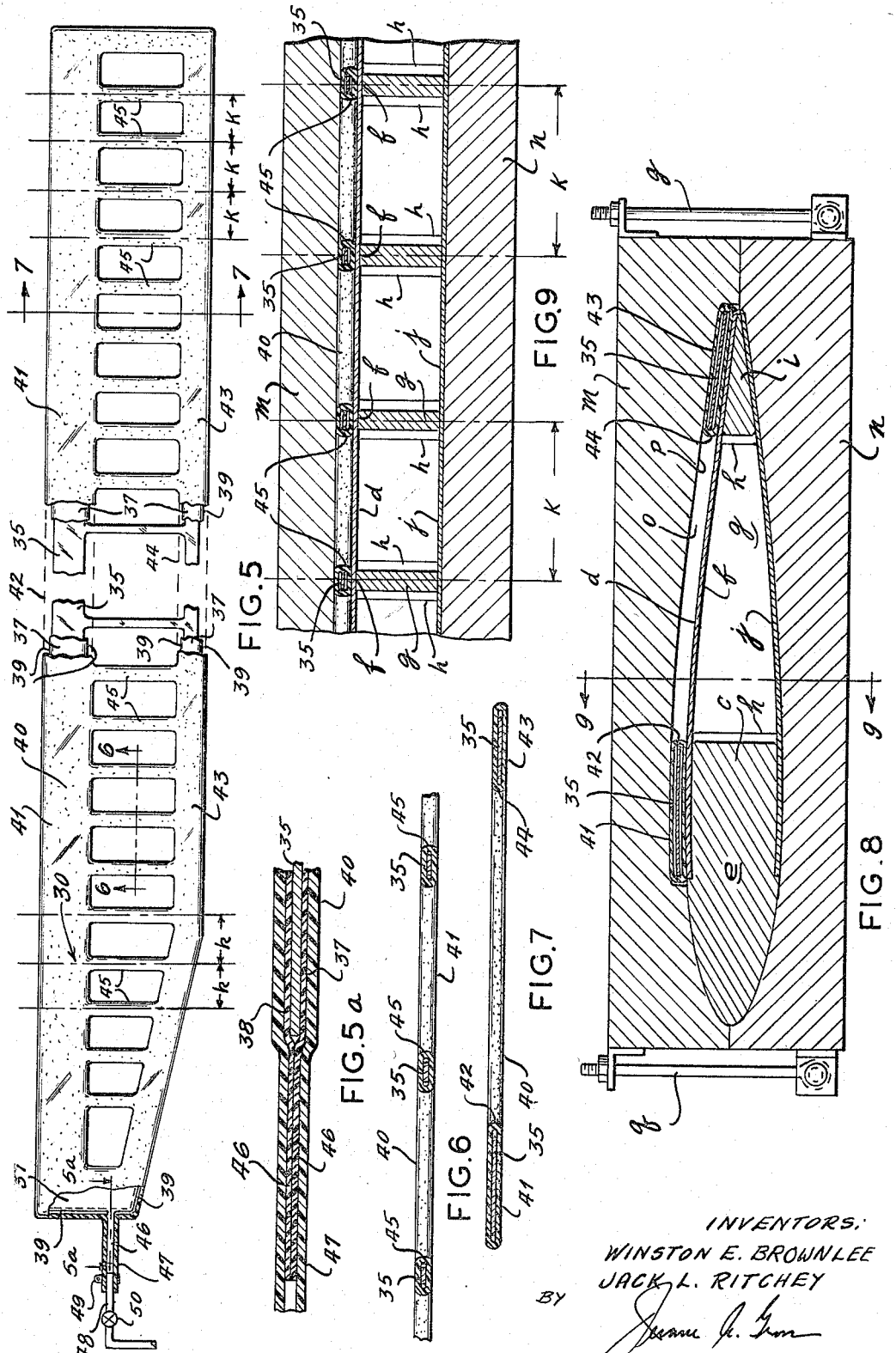

United States Patent Office 3,285,794
Patented Nov. 15, 1966

3,285,794
INFLATABLE TOOL FOR APPLYING BONDING PRESSURE TO PATTERNED AREAS
Winston E. Brownlee, Suttons Bay, and Jack L. Ritchey, Traverse City, Mich., assignors to Parsons Corporation, Detroit, Mich., a corporation of Michigan
Filed Feb. 25, 1963, Ser. No. 260,590
4 Claims. (Cl. 156—581)

This invention relates to inflatable tools for applying pressure over a patterned portion of a surface area, for use in processes such as adhesive bonding and the like.

A specific example of the use of this invention is for the bonding of airfoil skins onto spaced ribs. The pressures attendant to bonding must be applied firmly and evenly over such portions of the airfoil skin areas which correspond in pattern to the spaced ribs. Such pressures could not be resisted by unsupported areas of skin between the ribs; and must not be applied to them.

A rigid mold would theoretically suffice for this purpose if there was no problem of manufacturing tolerance as between such workpieces and the mold surface itself. No-tolerance conditions are of course unattainable. In practice, a flat spot on the rib edge, for example, would result in its failure to receive any bonding pressure from a rigid, curved mold.

If instead of a rigid mold surface, the manufacturer employed the practice of placing the structure to be bonded within a bag which when evacuated applies atmospheric pressure over the entire bag surface, the portions of skin between the ribs would be subjected to this pressure, tending to deform and perhaps to damage the skins in these unsupported areas.

To apply pressures along chosen areas, one expedient which suggests itself is the use of inflated ordinary round air hoses. Apart from pattern difficulties, these present the problem of how to locate and hold them in place. These tend to shift when inflated, especially when deflectable areas border on those to which pressure is to be applied.

In general the present invention consists in providing a flat-folded inflatable pressure bag tool to apply tolerance take-up pressure over a precisely patterned portion of a surface area. Within a pressure bag formed about a permanently-enclosed flat pattern of flexible material, is a template-like member, formed preferably of aluminum or other sheet metal or material characterized by substantial rigidity in the plane of the sheet. Its template-like edges define a plan form corresponding substantially to the portion of the surface area over which pressure is to be precisely applied; hence it is referred to herein as a pressure-area pattern. It is so preferably adhered to or encapsulated within the flexible bag pattern, as to leave marginal portions of the pattern's flexible material extending beyond the edges of the pressure-area pattern. When the bag is inflated to take up tolerances and apply pressure, any tendency to shift is counteracted by the in-plane resistance of the pressure area pattern. Deflection of the margins of the bag patterns along the edges of the pressure-area pattern protects the bag from being cut.

In the accompanying drawings:

FIGURE 5 is a plan view of a complete inflatable tool embodying the present invention, utilizing the construction shown in FIGURE 1.

FIGURE 5a is an enlarged fragmentary cross-section taken along line 5a—5a of FIGURE 5.

FIGURE 6 is a sectional view taken along line 6—6 of FIGURE 5, shown with the tool deflated.

FIGURE 7 is a sectional view taken along line 7—7 of FIGURE 5, shown with the tool deflated.

FIGURE 8 is a view somewhat schematic showing the inflatable tool of FIGURE 5 inflated within a fixture, for adhesive bonding of a top skin to a helicopter rotor blade.

FIGURE 9 is a cross-sectional view taken along line 9—9 of FIGURE 8.

Figure 1:
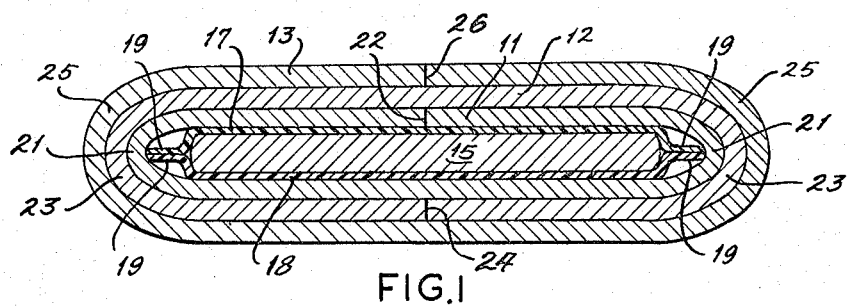
FIGURE 1 is a sketch of a typical cross-section through a single pattern element of an inflatable tool, constructed in accordance with the present invention.
Figure 2:
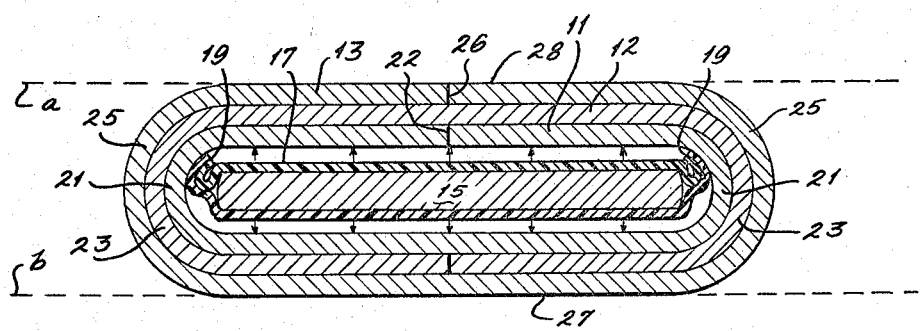
FIGURE 2 is a sketch similar to FIGURE 1 showing the positioning of the elements therein when distended by inflation against the resistance of a mold and a workpiece surface shown in dashed lines.

The construction shown in FIGURES 1 and 2 is formed by the following steps:

An inner laminate 11, intermediate laminate 12 and outer laminate 13 are cut to suitable plan form. They are of glass fiber fabric or other ply reinforcement material, impregnated and coated with uncured rubber or other vulcanizable material in tacky form. Independently a pressure area pattern 15 is cut from aluminum sheet material or other sheet material, preferably metal, characterized by substantial rigidity in the plane of the sheet, so as to resist edgewise-applied forces. The pressure area pattern 15 establishes with substantial precision the area over which pressure will be applied by the bag surface against a resisting workpiece when inflation distends the bag edges to roundness.

An interior bag pattern, corresponding to the entire area between the edges of the inner laminate 11 as defined by folding, consists of the pressure area pattern 15 together with larger non-adhesive film patterns, namely an upper bag pattern film 17 and a lower bag pattern film 18 formed of material having a non-adherent outer surface, such as Teflon. The inner surface (that is, adjacent to the pressure area pattern 15) is made adherent by etching with acid or other suitable means, and is adhered to the upper and lower surface of the pressure area pattern 15 so as to envelope sealingly or encapsulate it and leave marginal portions 19 adhered together, as shown in FIGURE 1, projecting flexibly around the entire pressure area pattern 15. The marginal portions 19 thus extend into the edge folds of the inner laminate 11 as will now be described.

The pressure area pattern 15, so sealedly enveloped within the upper and lower bag pattern films 17, 18, is centered on the tacky uncured rubber-like surface of the inner laminate 11; and 180° edge folds 21 of its edges are made precisely along the outer edges of the margins 19 of the bag pattern films 17, 18, flatly on top of the pressure area pattern 15. The edges of the inner laminate 11 are thus brought together in a butt joint 22 centered over the pressure area pattern 15. The tacky material at the butt join 22 is then worked together so that the ends of the fibers of its fabric reinforcing material are intimately positioned, even though not connected to each other.

The intermediate laminate 12 is then laid out flat, the parts theretofore assembled are centered upon it with the butt joint 22 facing down, and edge folds 23 are made precisely against the edge folds 21, placing the tacky material of the intermediate laminate 12 in intimate contact with that of the inner laminate 11. The fibers and rubber-like material at the edges of the intermediate laminate 12 are worked together into a similar butt joint 24 opposite to the butt joint 22.

This assembly is then centered on the outer laminate 13 with the butt joint 22 facing downward; bag edge folds 25 are made in the outer laminate 13 similarly to bring its tacky material into flat intimate contact with that of the intermediate laminate 12; and the edges of the outer laminae 13 are brought together in a butt joint 26 which may be in registration with the inner laminate butt joint 22 and on the same side of the article.

Where the pattern is not a straight simple one, edges of it are nevertheless similarly formed. Joints in irregular portions are made either by cutting out material or by inserting additional material. Lap joints may often be made, for their extra thickness may in many cases be accommodated by recessing the wall of the mold or fixture in which the inflatable tool is used. Air inlet means are provided suitably for the particular use.

The inflatable tool so formed is then vulcanized in its flat folded form, under such heat and pressure as is necessary to vulcanize the material to cured condition. For this purpose edge-clamping pressure may be applied outwardly of the marginal portions 19 to remove the voids shown in FIGURE 1. The non-adherence of the films 17, 18 will leave an inflatable cavity around the pressure area pattern 15, as shown in FIGURE 2.

When the inflatable tool, made in the manner shown in FIGURE 1, is inflated in a fixture or mold, whose wall is shown schematically by the upper dotted line $a$ of FIGURE 2, against a workpiece surface as is indicated by the line $b$ shown schematically in FIGURE 2, the tool will distend, in a manner substantially as shown in FIGURE 2. The edge folds 21, 23, 25 will round, drawing them inward, until limited by the edgewise resistance of the pressure area pattern 15, as the marginal portions 19, having no such resistance, flex upward or downward. The edge resistance of the pressure area pattern 15 thus prevents shifting of the bag out of the pressure pattern defined by the pressure area pattern 15. In this sense, the inflatable tool may be thought of as essentially an inflatable pressure bag having a pressure-applying surface 27 (shown as the lower surface in FIGURE 2) and a pressure-resisting surface 28 shown in FIGURE 2 as pressing upwardly against the bonding fixture wall $a$. The pressure area pattern 15 may be thought of as resistive means within the bag which makes contact with the folded edges 21 of the inner laminate 11, whenever the tool is sufficiently distended by inflation, thus preventing shifting of the area over which its pressure is applied.

Figure 3:
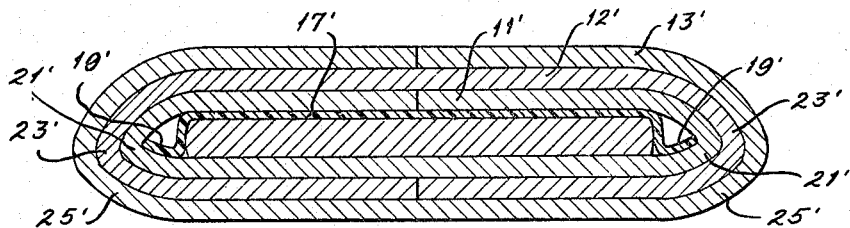
FIGURE 3 is a sketch, somewhat similar to FIGURE 1, of a modified construction embodying the present invention.
Figure 4:
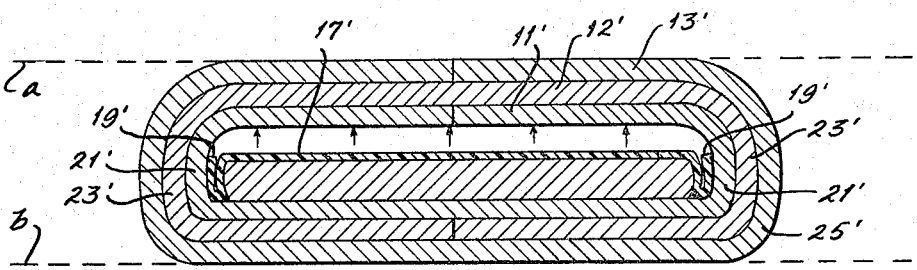
FIGURE 4 shows the modified construction of FIGURE 3 distended by inflation in a manner similar to that of FIGURE 2.

The modified form of invention schematically shown in FIGURE 3 is produced by a substantially similar method. Inner, intermediate, and outer laminates 11', 12', 13', are similarly cut, as is the pressure area pattern 15'. Only a single bag pattern film is used, it being designated 17'. It is presented adheringly onto the upper surface of the pressure area pattern 15', with its marginal portions 19' projecting flexibly around all edges of the pressure area pattern 15'. As in the embodiment of FIGURE 1, one surface of the otherwise non-adherent film 17' is etched or otherwise treated to render it adherable. The marginal portion 19', as well as the under-surface of the pressure area pattern 15' itself, are adhered directly to the tacky uncured rubber-like surface of the inner laminate 11', prior to making its edge folds 21'. The inner laminate 11' is then completed by making the bag edge folds 21' and bringing the laminate edges together in a butt joint 22', the laminate 11' being folded firmly against the non-adherent outer surface of the bag film 17' and butt joint 22' being worked together in the same manner as hereinabove described. The intermediate laminate 12' and the outer laminate 13' are applied in the same manner as was described in the embodiment of FIGURE 1, forming butt joints 24' and 26' as shown. The bag is then vulcanized and cured, as heretofore described. The inflated view, FIGURE 4, shows the positions of the parts when distension is limited by the space between the workpiece $b$ and the wall $a$ of the adhesive bonding fixture. In this embodiment the inflatable cavity exists only above the film 17', as shown in FIGURE 4. However the edges of the pressure area pattern 15' serve as resistive means to prevent shifting in the same manner as described in the prior embodiment.

Either of these methods of construction is used to construct a specialized inflatable tool shown in FIGURE 7, and generally designated 30, utilized to adhesively bond the closing skin of an airfoil such as that shown in cross-section in FIGURE 8. The terms "closing skin" means that skin which is applied last, normally to the areas between the spar and the trailing edge, in the case of a simple airfoil such as the wooden helicopter rotor blade generally designated $c$.

The problem is to supply firm pressure to those portions of the closing skin $d$ which are to be adhesively bonded in the closing operation. Such portions include those covering the aft portion of the spar $e$, the airfoil contoured edge $f$ of the spar ribs $g$, glue blocks $h$ which may secure the spaced ribs to the spar $e$ and to a spanwise triangular trailing edge insert $i$. The same inflatable tool 30 or a similar one might be used for bonding the first applied skins, such as the lower skin $j$; however, since the adhesion of the first applied skin $j$ can be inspected visually, the problem of securely bonding it is somewhat less critical.

Seen in plan form, as in FIGURE 5, the inflatable tool 30 illustrates a typical complex design of areas over which adhesive bonding pressure must be applied. The tool 30 is thus essentially ladder-like in its pattern; the spaces between the rungs of the ladder, when distended, are those to which no pressure is to be applied. A consideration of the cross sectional view FIGURE 9 discloses how important it is that the ladder "rungs" be precisely spaced; otherwise the inflation pressure would be applied not to the edges $f$ of the contoured ribs $g$ but rather to the unsupported areas of the skin $d$ between the spaced ribs $g$.

Referring to FIGURE 5, the total pattern of the areas to which pressure is to be applied is established by the metal template-like pressure area pattern 35, encapsulated or enveloped in precise registration between an upper bag pattern film 37 and a lower bag pattern film 38, whose outer surfaces are non-adherent to rubber. The marginal portions 39 of the upper bag pattern film 37 project flexibly around all edges of the metal pressure area pattern 35, in the same manner as shown in FIGURE 1.

A multi-ply pressure bag 40 is formed to a ladder-like pattern by folding precisely along the edges of the marginal portions 39, and using the other procedures described in connection with FIGURE 1. The bag 40 includes: a forward bag portion 41 whose aft line 42 corresponds substantially to the aft margin of the spar $e$ and which extends forward as far as necessary to apply pressure to the forward edge of the skin $d$; an aft pressure bag portion 43 which has a forward line 44 corresponding to the forward line of the trailing edge insert $i$ and which extends as far aft as the skin $d$; and interconnecting tubular portions 45 which are rung-like in their pattern and correspond in their spacing or pitch between center lines $k$ to that of the airfoil ribs $g$.

At the left end of the pressure bag 40, the non-adherent surface films 37, 38 have slender extension portions 46 (only the lower of which is shown in FIGURE 5) in which no metal pattern is present. The ply material of the bag 40, folded around and over these non-adherent film extension portions 46, forms on vulcanizing a flexible tube portion 47. A metal fiber tube 48 is inserted therein and secured by a clamp 49; and provided with a check valve 50 for retaining air at any chosen inflation pressure.

FIGURES 6 and 7 are cross-sectional views of the bag as deflated. These figures are somewhat simplified, it being understood that the details of construction shown in FIGURE 1 are applicable.

The tool 30 is intended to be utilized within an adhesive bonding fixture, shown schematically in the cross-sectional sketch FIGURE 8. Except for obvious modifications to permit the use within it of the inflatable tool 30, the construction of such an adhesive bonding fixture is familiar. It may have an upper fixture half *m* and a lower fixture half *n*, both internally contoured to provide a cavity large enough to receive the partially completed airfoil (the spar *e*, ribs *g*, trailing edge member *i*, lower skin *j*, and glue blocks *h*) together with the closing skin *d* which is to be adhered in place. The lower fixture half *n* is contoured to support such partially completed airfoil. However an open space *o* is left in the internal contour of the upper half *m* so that its pressure-resisting surface *p* will be sufficiently far removed from the contour of the outer airfoil surface to accommodate the tool 30 when deflated. Inflation requires only so much distension of the bag 40 as will take up all tolerances—those of the mold and the workpieces to be joined.

In use, the partly assembled airfoil and closing skin, with their mating surfaces coated with adhesive, are positioned on the fixture half *n*, the tool 30 is accurately positioned atop the closing skin *d*, the upper fixture half *m* is located thereover and drawn down by the clamps *q*. Air is supplied through the tube portion 47 which projects outward from between the fixture halves *m*, *n*. The air is supplied at the pressure desired for adhesive bonding within the tool 30; and if the adhesive utilized requires heating, the entire assembly is subjected to such heat for the requisite time.

It will be seen from FIGURE 2 that the pressure bag inflates only slightly. The tensile strength of the ply material of the bag 40 resists elongation; the bag 40 merely distends; and its maximum possible distension is limited by the bringing of one or more of the bag edges into contact with adjacent edge portions of the metal pressure area pattern 35. Such edge contact avoids any possibility that, under inflation, any parts of the bag 40, such as any of its slender rung-like portions 45, will move away from the precise pressure areas defined by the metal pattern 35.

The present invention has been utilized with great success in the specific embodiment shown in FIGURES 5–9. Secure, reliable adhesive joints of closing skins *d* have been obtained routinely, despite tolerances such as flat spots in the contoured rib edges *f*, and without exertion of pressures on areas of the closing skin between the ribs. The insecurity which heretofore was felt about joining closing skins has thus been substantially eliminated.

From this disclosure, other utilizations and modifications of the invention will be apparent to those skilled in the art and familiar with its problems. Accordingly the present invention is not to be construed narrowly but instead as fully coextensive with the scope of the claims:

We claim:

1. For use in applying pressure to a patterned surface area during adhesive bonding and the like,
  an inflatable tool comprising
  a rigid planar template defining such pattern, and
  a flat pressure bag enclosing said template and formed of flexible material impervious to the passage of air and which does not elongate when distended by air pressure,
  the bag having a pressure-applying side and a pressure-resisting side meeting at bag edges closely outward of the edges of the template,
  whereby, as the bag is distended from flatness by inflation, the template makes pattern-retaining contact with the bag edges, thus preventing shifting of the bag pressure-applying surface away from such patterned surface area.

2. An inflatable tool as defined in claim 1,
  wherein the bag material is vulcanizable,
  together further with a flat flexible interior bag pattern adjacent to said template and corresponding in contour to the entire area between the bag edges when deflated to flatness,
  the said flexible interior pattern having one surface characterized by non-adherency on vulcanization,
  whereby to provide for inflation of the flat bag regardless of conditions of heat and pressure.

3. An inflatable tool as defined in claim 2,
  wherein the flexible pattern encapsulates the template and its non-adherent surface is presented outwardly therefrom and adjacent to the inner surface of a bag side.

4. For use in applying pressure for adhesively bonding the skins of airfoils of the type having a plurality of spaced ribs connecting a spar with a trailing edge,
  an inflatable tool comprising
  a rigid planar template defining a ladder-like pressure pattern and including
  a forward portion having an aft line corresponding to the aft margin of the spar,
  an aft portion having a forward line corresponding to the forward line of the trailing edge, and
  interconnecting linear portions spaced from each other correspondingly to the spacing of the airfoil ribs, and
  a flat pressure bag of similar ladder-like pattern enclosing said template and formed of flexible material impervious to the passage of air and which does not elongate when distended by air pressure,
  said bag having a pressure-applying side and a pressure-resisting side meeting at bag edges closely outward of the edges of said template,
  whereby as the bag is distended from flatness by inflation, the edges of the linear interconnecting portions of the template make pattern-retaining contact with the adjacent edges of the bag, thus to prevent shifting thereof away from the ladder-like pattern of the template.

References Cited by the Examiner

UNITED STATES PATENTS

| | | | |
|---|---|---|---|
| 2,424,315 | 7/1947 | Hyatt et al. | 156—289 |
| 3,179,039 | 4/1965 | Christensen | 100—211 |

FOREIGN PATENTS

| | | |
|---|---|---|
| 603,753 | 8/1960 | Canada. |

EARL M. BERGERT, *Primary Examiner.*

DOUGLAS J. DRUMMOND, *Examiner.*